United States Patent
Zou

(10) Patent No.: US 12,391,844 B2
(45) Date of Patent: Aug. 19, 2025

(54) CONDUCTIVE INK FUNCTIONAL MATERIAL AND APPLICATION AND PREPARATION METHOD THEREOF

(71) Applicant: Dreisam (Beijing) Medical Technology Co., Ltd., Beijing (CN)

(72) Inventor: Peng Zou, Beijing (CN)

(73) Assignee: DREISAM (BEIJING) MEDICAL TECHNOLOGY CO., LTD., Beijing (CN)

( * ) Notice: Subject to any disclaimer, the term of this patent is extended or adjusted under 35 U.S.C. 154(b) by 285 days.

(21) Appl. No.: 18/326,180

(22) Filed: May 31, 2023

(65) Prior Publication Data

US 2023/0303880 A1    Sep. 28, 2023

Related U.S. Application Data

(63) Continuation of application No. PCT/CN2021/132855, filed on Nov. 24, 2021.

(30) Foreign Application Priority Data

Dec. 1, 2020    (CN) .......................... 202011382176.X
Dec. 1, 2020    (CN) .......................... 202011385579.X

(51) Int. Cl.
| | | |
|---|---|---|
| C09D 11/52 | (2014.01) | |
| B41M 5/00 | (2006.01) | |
| B41M 5/52 | (2006.01) | |
| C09D 11/38 | (2014.01) | |

(52) U.S. Cl.
CPC ............ *C09D 11/52* (2013.01); *B41M 5/0047* (2013.01); *B41M 5/5209* (2013.01); *C09D 11/38* (2013.01)

(58) Field of Classification Search
CPC ....... C09D 11/322; C09D 11/38; C09D 11/52; B41M 5/0047; B41M 5/5209
See application file for complete search history.

(56) References Cited

U.S. PATENT DOCUMENTS 7,588,670 B2 *    9/2009    Rodgers ................ C09D 11/52
                                                              204/403.14
2006/0226006 A1    10/2006    Rodgers et al.

FOREIGN PATENT DOCUMENTS

| CN | 102590305 A | 7/2012 |
| CN | 108976412 A | 12/2018 |
| CN | 112574619 A | 3/2021 |
| CN | 112625507 A | 4/2021 |
| WO | WO 2012133296 | * 10/2012 ............... B22F 1/02 |

* cited by examiner

Primary Examiner — Anh T Vo
(74) Attorney, Agent, or Firm — MUNCY, GEISSLER, OLDS & LOWE, P.C.

(57) ABSTRACT

A conductive ink functional material and a preparation method thereof. The conductive ink functional material is a surface-functionalized metal nanoparticle, and the surface of the metal nanoparticle is bonded to a molecule containing an electronic medium by a covalent bond. A functionalized conductive ink and a preparation method thereof. The ink is prepared from the conductive ink functional material.

15 Claims, 2 Drawing Sheets

CONDUCTIVE INK FUNCTIONAL MATERIAL AND APPLICATION AND PREPARATION METHOD THEREOF

CROSS REFERENCE TO RELATED APPLICATIONS

This application is a By-Pass Continuation of co-pending Application No. PCT/CN2021/132855, filed on Nov. 24, 2021, for which priority is claimed under 35 U.S.C. § 120; and this application claims priority of Application No. 202011382176.X filed in China on Dec. 1, 2020 and Application No. 202011385579.X filed in China on Dec. 1, 2020 under 35 U.S.C. § 119, the entire contents of all of which are hereby incorporated by reference.

FIELD OF TECHNOLOGY

The present disclosure belongs to the field of sensors, and particularly relates to a conductive ink functional material and application and a preparation method thereof.

BACKGROUND

With the demands for high precision and high integration of electronic equipment, an inkjet printing technology has been gradually emerging in the field of printed electronics. Compared with conventional processes for preparing conductive circuits with printed circuit boards, a method for preparing a conductive circuit by the inkjet printing technology has the advantages of high manufacturing speed, environmental friendliness, simple process, low cost and diversified functions. Based on the production of the conductive circuits on flexible circuit boards, the productivity of products can be greatly improved. The key is to develop a conductive ink that meets demands of inkjet printing equipment and final products. Due to small size, difficult agglomeration, low melting point and other outstanding advantages, a metal nanoparticle has been widely used in the research and production of the conductive ink. In inkjet printing electronics, a printer, an ink and a substrate conductive ink are mainly involved, which can be applied to radio frequency identification (RFID), an organic light emitting diode (OLED), a printed circuit board (PCB), biosensors, flexible sensors and other aspects. An inkjet conductive ink material has a great potential in RFID antennas, PCBs and other aspects such as display electrode components, thus becoming a representative in the development direction of thin-film printed electronic materials. At present, in application of the conductive ink in preparation of electrodes of the biosensors, selective study of the conductive ink in the biosensors is not enough, and the prepared electrodes of the biosensors usually have the defects of high sensitivity and low electron transmission efficiency.

SUMMARY

In order to solve the above problems, the present disclosure discloses a conductive ink functional material. The surface of a metal nanoparticle is bonded to a molecule containing an electronic medium by a covalent bond. After a conductive ink prepared therefrom is printed to form a conductive layer and an electrode of a biosensor are prepared, due to the action of an electronic medium layer, electrons generated by an enzyme reaction on a working electrode of the biosensor can be directly transmitted to the surface of the electrode, so that the electrode can detect biological substances at lower working voltage, and the sensitivity of the biosensor to interfering substances is reduced. Meanwhile, a biological electrode prepared from the conductive ink functional material has higher electron transmission efficiency, and the electrode area can be greatly decreased without reducing the signal intensity.

In order to solve the above problems, the present disclosure further discloses a functionalized conductive ink, which is prepared by dissolving a surface-functionalized metal nanoparticle as the conductive ink functional material. After a biological electrode is prepared by printing with the functionalized conductive ink, higher electron transmission efficiency is achieved, and the electrode area can be greatly decreased without reducing the signal intensity.

In view of the above problems, the present disclosure provides a conductive ink functional material. The conductive ink functional material is a surface-functionalized metal nanoparticle having a structure as shown in a formula I:

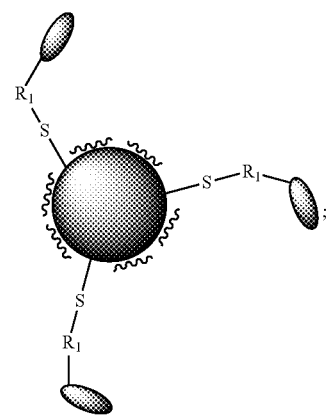

is a metal nanoparticle;

is a medium structure; ∮ is a protective agent; and $R_1$ is an organic structure consisting of C, N, O and H.

Further, the medium structure is an organic complex of iron; and the $R_1$ is selected from a linear/branched/cyclic hydrocarbyl, an organic structure containing lipid/ether/amide/quaternary ammonium group/polyethylene glycol, or any combination of the hydrocarbyl and the organic structure.

Further, the medium structure is ferrocene or a derivative thereof having the following structural formula:

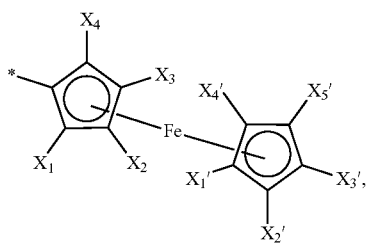

$X_1$, $X_2$, $X_3$, $X_4$, $X_1'$, $X_2'$, $X_3'$, $X_4'$, and $X_5'$ are independently selected from one of the following groups, * refers to other structures of the conductive ink functional material except for the selected medium structure:

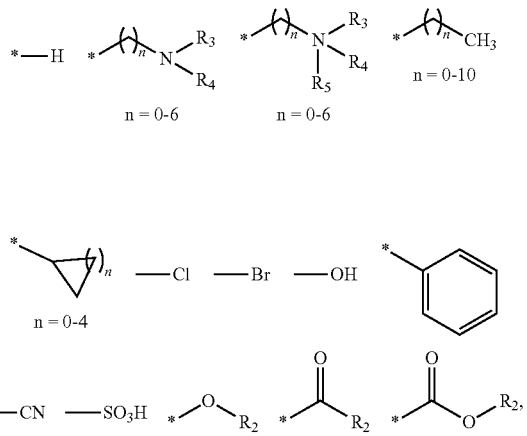

$R_2$, $R_3$, $R_4$, and $R_5$ are a structure consisting of H, a linear/branched/cyclic hydrocarbyl, and a group containing lipid/ether, and * refers to other structures except for the selected group in the groups.

Further, the $R_1$ is selected from the following structures or any combination thereof:

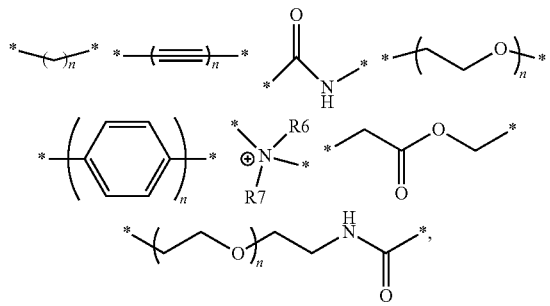

n is an integer ranging from 1 to 10, $R_6$ and $R_7$ are H or a linear/branched/cyclic hydrocarbyl, and * refers to other structures of the conductive ink functional material except for the selected $R_1$ structure.

Further, the metal is one of Ag, Au, Cu, Zn, Ni, Co, Pd, Pt, Zr, Cr, Ru, Os, Ir, Sn, Pb, Al, Mo, and W; and the protective agent is one of polymers with the following structures and has a molecular weight of 500-1,000,000:

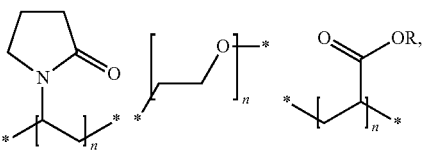

R is a structure consisting of H, a linear/branched/cyclic hydrocarbyl, and a group containing lipid/ether, and * refers to other structures of the conductive ink functional material except for the selected protective agent.

Further, the metal is Ag, Au, Pd, or Pt; and the protective agent is one of polyvinylpyrrolidone, polyacrylic acid, polyacrylate, and polyethylene glycol, and has a molecular weight of 1,000-10,000.

The present disclosure further provides a functionalized conductive ink, which is prepared from the conductive ink functional material. The functionalized conductive ink can be applied to a biosensor.

According to a preparation method of the conductive ink functional material, a reaction route includes:

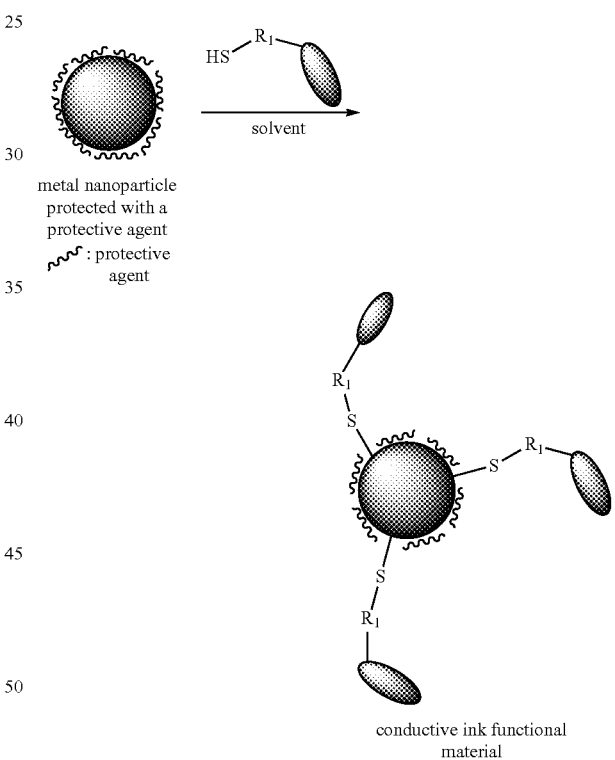

dissolving a metal nanoparticle; adding a surface-functionalized molecule

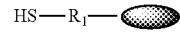

to an obtained solution; conducting stirring for a reaction at room temperature; after the reaction is completed, conducting centrifugation at high speed to separate a solid phase and a liquid phase; and subjecting the obtained solid phase to washing and vacuum drying to obtain the conductive ink functional material.

Further, the metal nanoparticle is added to a solvent for full dissolution by ultrasonic treatment; the surface-functionalized molecule

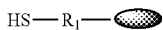

is added, where the mass ratio of the metal nanoparticle to the

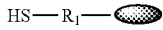

is 1,000:1 to 1:10; stirring is conducted for a reaction at room temperature; after the reaction is completed, centrifugation is conducted at 10,000 rpm to separate a solid phase and a liquid phase; and the obtained solid phase is washed for 3 times, and then vacuum drying is conducted to obtain the conductive ink functional material.

Further, the mass ratio of the metal nanoparticle to the

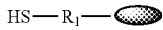

is 10:1 to 1:10; the stirring is conducted for a reaction at room temperature for 8 hours; and after the reaction is completed, the centrifugation is conducted at 10,000 rpm for 1-5 minutes to separate a solid phase and a liquid phase.

Further, a preparation method of the metal nanoparticle includes: dissolving a metal salt and a protective agent at a mass ratio of 10:1 to 1:1,000 in a solvent separately; heating a protective agent solution to 120° C., and adding a metal salt solution dropwise under stirring; after the dropping is completed, conducting stirring continuously for a reaction at 120° C. for 6 hours, and conducting cooling to room temperature; after the reaction is completed, conducting washing on an obtained solution for 3 times; and drying a precipitate at 40° C. for 12 hours to obtain the metal nanoparticle.

Further, a conductive ink functional material and water are mixed and subjected to ultrasonic treatment; diethylene glycol and glycerol are added for adjusting the viscosity to 5-200 CPS, so as to obtain a functional conductive ink containing the conductive ink functional material with a mass concentration of 5%-40%; and then the functional conductive ink is filtered and stored.

Further, during application of the functionalized conductive ink, electrodes of a biosensor are prepared by printing with a general conductive ink first; one electrode is completely covered with the functionalized conductive ink by an inkjet printing or micro-dropping method, and subjected to drying, followed by heat curing or NIR photocuring; and then, a glucose oxidase-containing solution is dropped on the surface of the electrode, subjected to drying, so as to form a working electrode.

Further, the heat curing is conducted at a temperature of 70-100° C.; and the NIR photocuring is conducted at 800-1,200 nm and 0.1-2 mW/m$^2$.

The present disclosure discloses a conductive ink functional material and a preparation method thereof. The surface of a metal nanoparticle is bonded to a molecule containing an electronic medium by a covalent bond. After a conductive ink prepared therefrom is printed to form a conductive layer and an electrode of a biosensor are prepared, due to the action of a medium layer directly fixed to the surface of the conductive layer, electrons generated by an enzyme reaction on a working electrode of the biosensor can be directly transmitted to the surface of the electrode, so that the electrode can detect biological substances at lower working voltage, and the sensitivity of the biosensor to interfering substances is reduced. Meanwhile, a biological electrode prepared from the conductive ink functional material has higher electron transmission efficiency, the electrode area can be greatly decreased without reducing the signal intensity, and thus the size of the biosensor is significantly reduced. Moreover, the present disclosure further discloses a functionalized conductive ink and application thereof. The functionalized conductive ink is prepared by dissolving a surface-functionalized metal nanoparticle as the conductive ink functional material. Since the surface of the metal nanoparticle is bonded to a molecule containing an electronic medium by a covalent bond, the surface is functionalized, a conductive ink prepared therefrom is printed to form a conductive layer, and an electrode of a biosensor is prepared by attaching a biological enzyme to the surface. Due to the action of an electronic medium layer directly fixed to the surface of the electrode, electrons generated by an enzyme reaction on a working electrode of the biosensor can be directly transmitted to the surface of the electrode, so that the electrode can detect biological substances at lower working voltage, and the sensitivity of the biosensor to interfering substances is reduced. Meanwhile, a biological electrode prepared from the conductive ink has higher electron transmission efficiency, the electrode can be greatly decreased without reducing the signal intensity, and thus the purpose of reducing the size of the biosensor is achieved.

Other features and advantages of the present disclosure are described in the subsequent specification, and a part will become apparent from the specification or will be understood through the implementation of the present disclosure. The objectives and other advantages of the present disclosure may be realized and achieved by the structures indicated in the specification, claims and attached drawings.

BRIEF DESCRIPTION OF THE DRAWINGS

In order to make the technical solutions in the embodiments of the present disclosure or in the prior art more clearly illustrated, drawings required to be used in the description of the embodiments or the prior art are briefly introduced below. Apparently, the drawings described below are some embodiments of the present disclosure, and other drawings may also be obtained by persons of ordinary skill in the field without creative labor according to the drawings.

DESCRIPTION OF THE EMBODIMENTS

Figure 1:
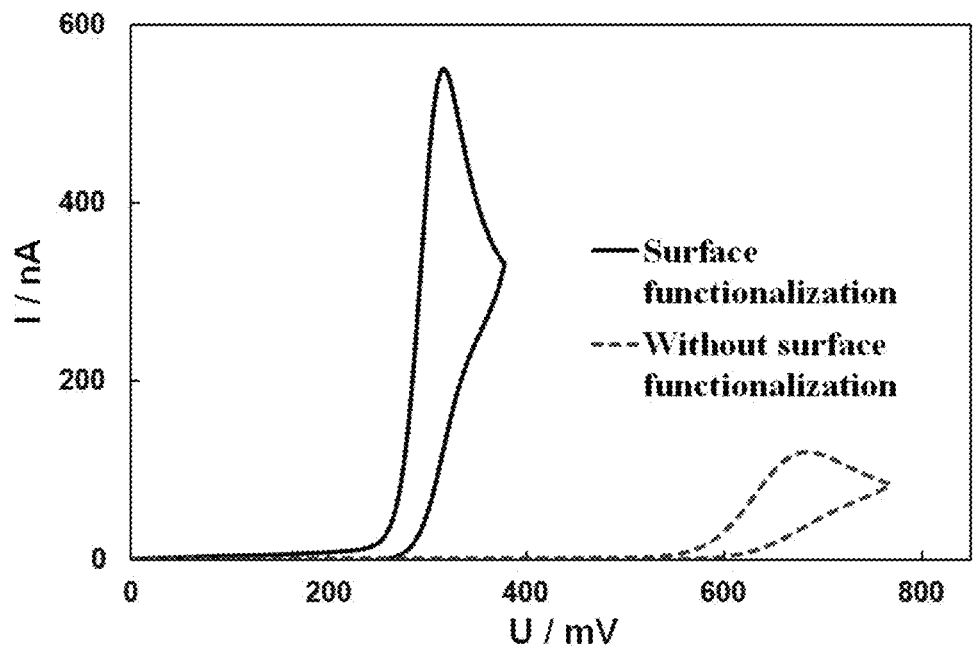
FIG. 1 is a diagram showing the comparison of cyclic voltammetry curves of a glucose biosensor made from a conductive ink prepared from a conductive ink functional material prepared by the present disclosure and a glucose biosensor made from a conductive ink prepared from a silver nanoparticle without surface functionalization in a glucose solution.

In order to make the objectives, technical solutions and advantages of the embodiments of the present disclosure more clear, the technical solutions in the embodiments of the present disclosure are clearly and completely illustrated below in conjunction with the attached drawings in the embodiments of the present disclosure. Obviously, the embodiments described are merely a part, rather than all of the embodiments of the present disclosure. Based on the embodiments of the present disclosure, all other embodiments obtained by persons of ordinary skill in the field without creative labor fall within the protection scope of the present disclosure.

Example 1 of the Present Disclosure: Preparation Method of a Conductive Ink Functional Material (1) Synthesis of a metal nanoparticle: 1.0 g of silver nitrate and 10.0 g of polyethylpyrrolidone (PVP) (with a molecular weight of 3,000) as a protective agent were dissolved in 50.0 mL of ethylene glycol separately. A polyethylpyrrolidone solution was heated to 120° C., and after the solution was stable, a silver nitrate solution was slowly added dropwise to the polyethylpyrrolidone solution under thorough stirring. After the dropping process was completed, stirring was conducted continuously for a reaction at 120° C. for 6 hours, and after the reaction was completed, cooling was conducted to room temperature. An obtained solution was poured into 100 ml of ethanol, followed by thorough stirring and high-speed centrifugation at a rotation speed of 10,000 rpm, and washing was completed to obtain a silver nanoparticle precipitate, where the washing process was repeated for 3 times. Then the obtained precipitate was dried at 40° C. for 12 hours to obtain a silver nanoparticle.

(2) Preparation of a conductive ink functional material: 0.4 g of the silver nanoparticle obtained in step (1) was added to 5.0 mL of ethanol for ultrasonic treatment to obtain a stable suspension. 5 mL of an alcohol solution of mercaptan-polyethylene glycol-ferrocene

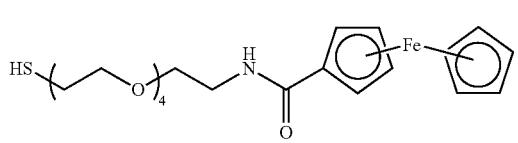

with a concentration of 0.02 g/mL was added to the suspension, stirring was conducted for a reaction at room temperature for 8 hours, and centrifugation was conducted at a rotation speed of 10,000 rpm to separate a solid phase and a liquid phase. The obtained solid phase was added to 5 mL of ethanol for thorough mixing, centrifugation was conducted on an obtained suspension at a rotation speed of 10,000 rpm, and a liquid phase was removed. Washing was completed to obtain a solid, where the washing process was repeated for 3 times. Then the obtained solid was subjected to vacuum drying in an environment at room temperature to obtain the conductive ink functional material.

Example 2: Preparation Method of a Conductive Ink Functional Material 1.0 g of a gold nanoparticle was added to 12.5 mL of butanol for ultrasonic treatment to obtain a stable suspension. 5 mL of a butanol-tetrahydrofuran solution (1:1) of

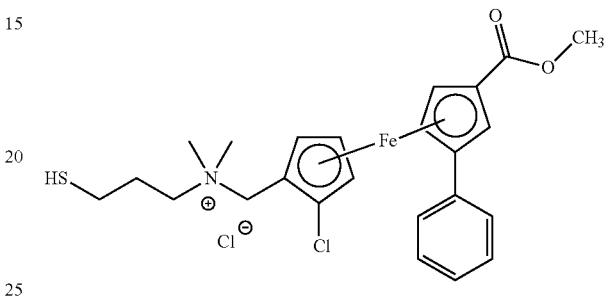

with a concentration of 0.1 g/mL was added to the suspension, stirring was conducted for a reaction at room temperature for 8 hours, and centrifugation was conducted at a rotation speed of 10,000 rpm to separate a solid phase and a liquid phase. The solid phase was added to 10 mL of a butanol-tetrahydrofuran mixed solvent (1:1) for thorough mixing, centrifugation was conducted on an obtained suspension at a rotation speed of 10,000 rpm, and a liquid phase was removed. Washing was completed to obtain a solid, where the washing process was repeated for 3 times. Then the obtained solid was subjected to vacuum drying in an environment at room temperature to obtain the conductive ink functional material.

Example 3: Preparation Method of a Conductive Ink Functional Material 0.4 g of a gold nanoparticle was added to 5.0 mL of propanol for ultrasonic treatment to obtain a stable suspension. 20 mL of a propanol solution of

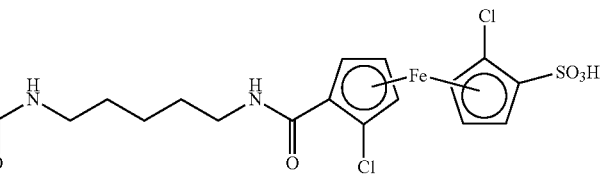

with a concentration of 0.2 g/mL was added to the suspension, stirring was conducted for a reaction at room temperature for 8 hours, and centrifugation was conducted at a rotation speed of 10,000 rpm to separate a solid phase and a liquid phase. The solid phase was added to 5 mL of propanol for thorough mixing, centrifugation was conducted on an obtained suspension at a rotation speed of 10,000 rpm, and a liquid phase was removed. Washing was completed to obtain a solid, where the washing process was repeated for 3 times. Then the obtained solid was subjected to vacuum drying in an environment at room temperature to obtain the conductive ink functional material.

Example 4: Preparation Method of a Conductive Ink Functional Material 0.4 g of a platinum nanoparticle was added to 10.0 mL of ethanol for dissolution to obtain a stable suspension. 20 mL of a butanol-tetrahydrofuran solution (1:1) of

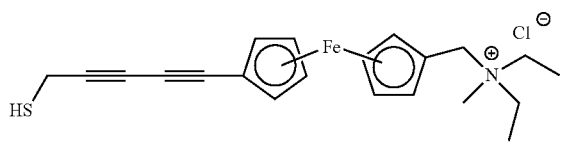

with a concentration of 0.2 g/mL was added to the suspension, stirring was conducted for a reaction at room temperature for 8 hours, and centrifugation was conducted at high speed to separate a solid phase and a liquid phase. The solid phase was added to 10 mL of a mixture of butanol and tetrahydrofuran (1:1) for thorough mixing, centrifugation was conducted on an obtained suspension at high speed, and a liquid phase was removed. Washing was completed to obtain a solid, where the washing process was repeated for 3 times. Then the obtained solid was subjected to vacuum drying in an environment at room temperature to obtain the conductive ink functional material.

Example 5: Preparation Method of a Conductive Ink Functional Material 0.1 g of a palladium nanoparticle was added to 5.0 mL of ethanol for dissolution to obtain a stable suspension. 0.5 mL of an alcohol solution of

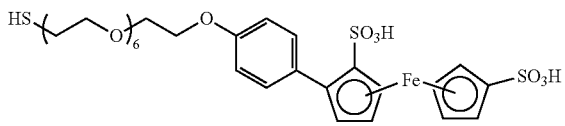

with a concentration of 0.02 g/mL was added to the suspension, stirring was conducted for a reaction at room temperature, and after the reaction was completed, centrifugation was conducted at a rotation speed of 10,000 rpm to separate a solid phase and a liquid phase. The solid phase was added to 250 mL of ethanol for thorough mixing, centrifugation was conducted on an obtained suspension at a rotation speed of 10,000 rpm, and a liquid phase was removed. Washing was completed to obtain a solid, where the washing process was repeated for 3 times. Then the obtained solid was subjected to vacuum drying in an environment at room temperature to obtain the conductive ink functional material.

In order to verify the effect of the present disclosure, comparative tests of properties of products are also carried out by the inventor. A conductive ink functional material for comparison is prepared, and made into conductive inks with the conductive ink functional material prepared in Example 1 respectively. Then biosensors are made for comparison of properties.

Experimental Example

Comparative Experiments of Properties of Biosensors
1. Experimental Materials:
The silver conductive ink functional material obtained in Example 1 and water were mixed at a ratio of 0.1 g:4 mL and subjected to ultrasonic treatment under the condition of an ice water bath. Diethylene glycol and glycerol were added for adjusting the viscosity to 12 CPS and the surface tension to 32 dyn/cm, so as to obtain a functionalized conductive ink. Then the functionalized conductive ink was filtered and stored at 7° C. for later use.

A three-electrode structure of a biosensor was printed on a PET substrate with a non-functionalized conductive ink first, and an Ag/AgCl reference electrode material was placed on one electrode. Next, the functionalized conductive ink prepared from the silver conductive ink functional material of the present disclosure was injected into an ink box of a DMP-2831 printer, a working electrode was prepared on the surface of the second electrode, and after printing was completed, the working electrode was placed in a drying oven for curing at 80° C. for 4 hours. After that, a glucose oxidase aqueous solution was dropped on the surface of the working electrode, and subjected to drying. Then, the sensor was placed in a vapor environment of glutaraldehyde for crosslinking of glucose oxidase, so as to complete the preparation of the working electrode. The rest one blank electrode was used as a counter electrode. The surface of the biosensor was coated with a layer of a hydrophilic polyurethane (HPU) film by a slit coating method, and after drying was completed, the film had a thickness of 2 μm.

Comparative example: A conductive ink was prepared from a silver conductive ink material without surface functionalization, and then a glucose biosensor was made according to the above method.

The two biosensors in comparative experiments are nearly the same in the thickness of conductive layers and the roughness of surfaces, are consistent in the use amount of enzymes on working electrodes and the morphology and size of enzyme layers, and are the same in the thickness of PU films.

2. Comparative Experiment of the Working Voltage of Biosensors

The two biosensors were placed in a 100 mg/dL glucose solution, and cyclic voltammetry curves were measured. Results are as shown in FIG. 1.

From the figure, it can be seen that the glucose biosensor prepared from the silver conductive ink material without surface functionalization (contrast system) reaches a maximum current value at a working voltage of 680 mV, while the sensor prepared from the surface-functionalized silver conductive ink functional material can reach a maximum current value at 320 mV, which is far less than the working voltage of the contrast system. The lower working voltage indicates that fewer interfering substances are involved in a reaction. Therefore, the glucose sensor prepared from the surface-functionalized silver conductive ink functional material has a better anti-interference ability.

From FIG. 1, it can also be seen that in the same concentration of the glucose solution, the glucose sensor prepared from the surface-functionalized silver conductive ink functional material has a detectable maximum current of 550 nA, which is more than four times that of the contrast system (120 nA), indicating that the charge transfer efficiency of an enzyme electrode can be significantly improved while the working voltage is reduced, and that is to say, the sensitivity of the sensor is improved.

In addition, the biosensors monitor biological substances by measuring the current generated. According to the data in FIG. 1, the following results can be obtained: when the electrodes are nearly the same in area and surface roughness (namely, nearly same total surface area), the electric quantity expressed as 550 nA÷120 nA≈4.6 times can be generated when the conductive ink functional material is used. That is to say, when the electrode is prepared from the conductive ink functional material, the current intensity of the electrode prepared from the conductive ink material without surface functionalization can be obtained by using only 1/4.6 of the electrode area.

3. Comparative Experiment of the Working Current of Biosensors

Figure 2:
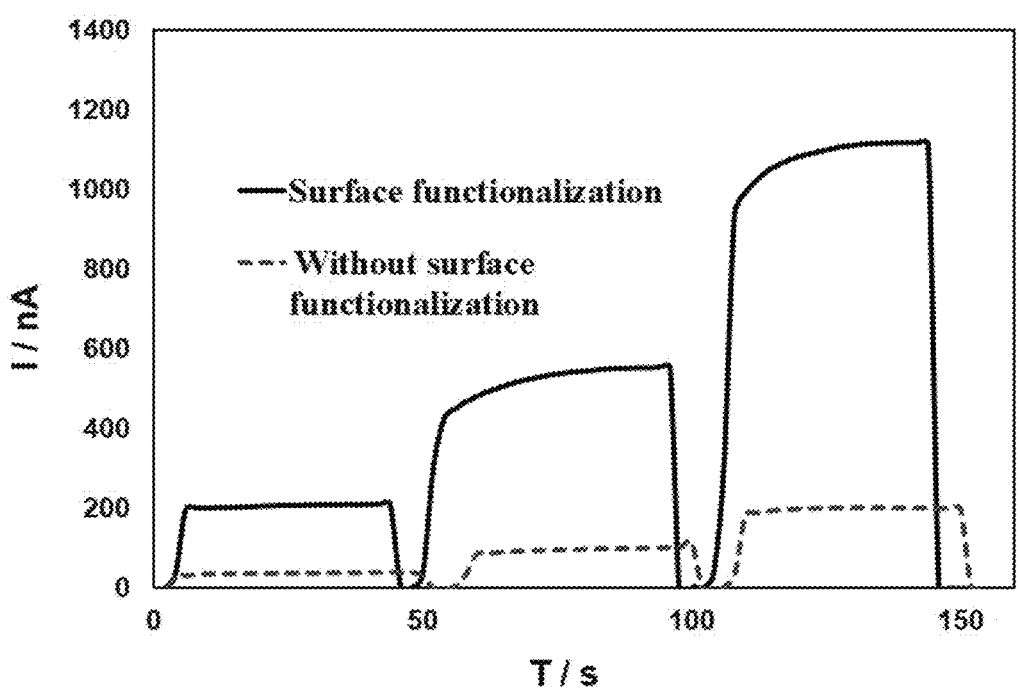
FIG. 2 is a diagram showing the comparison of the working current of a glucose biosensor made from a conductive ink prepared from a conductive ink functional material prepared by the present disclosure and a glucose biosensor made from a conductive ink prepared from a silver nanoparticle without surface functionalization in a glucose solution.

The two biosensors were placed in a 50 mg/dL glucose solution, a 100 mg/dL glucose solution, and a 200 mg/dL glucose solution in sequence, and then current signals of the two biosensors were measured. In the experiment, the biosensor prepared from the surface-functionalized silver conductive ink functional material was set to have a working voltage of 320 mV, and the contrast system was set to have a working voltage of 680 mV. Results are as shown in FIG. 2.

From the figure, it can be seen that the two biosensors can respond to changes in the concentration of glucose in the solutions, but in each concentration, the current value measured by the biosensor prepared from the surface-functionalized silver conductive ink functional material is much greater than that of the contrast system, indicating that the sensitivity of the sensor can be improved by using the surface-functionalized silver conductive ink functional material.

4. Conclusion

The above experiments show that the biological electrode made from the conductive ink prepared from the conductive ink functional material of the present disclosure has higher electron transmission efficiency, the electrode area can be decreased without reducing the signal intensity, and the purpose of reducing the size of the biosensor is achieved. Meanwhile, the obtained biosensor can detect biological substances at lower working voltage.

Examples of the functionalized conductive ink are also described in the embodiments of the present disclosure.

Example 6 of the Present Disclosure: Functionalized Conductive Ink

A functionalized conductive ink is prepared from a conductive ink functional material (namely a surface-functionalized silver nanoparticle water, diethylene glycol, and glycerol, where ƒ is polyvinylpyrrolidone with a molecular weight (Mn) of 3,000 g/mol.

A specific preparation method of the conductive ink functional material includes: adding a silver nanoparticle to a solvent for full dissolution by ultrasonic treatment; adding a surface-functionalized molecule

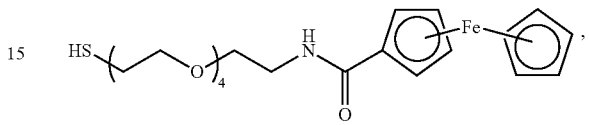

where the mass ratio of the silver nanoparticle to the

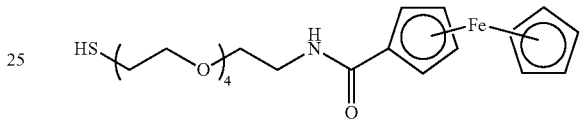

was 1,000:1; conducting stirring for a reaction at room temperature for 8 hours; after the reaction was completed, conducting centrifugation at 10,000 rpm for 5 minutes to separate a solid phase and a liquid phase; and washing the obtained solid phase for 3 times, and then conducting vacuum drying.

Example 7: Functionalized Conductive Ink

A functionalized conductive ink is prepared from a conductive ink functional material (namely a surface-functionalized gold nanoparticle

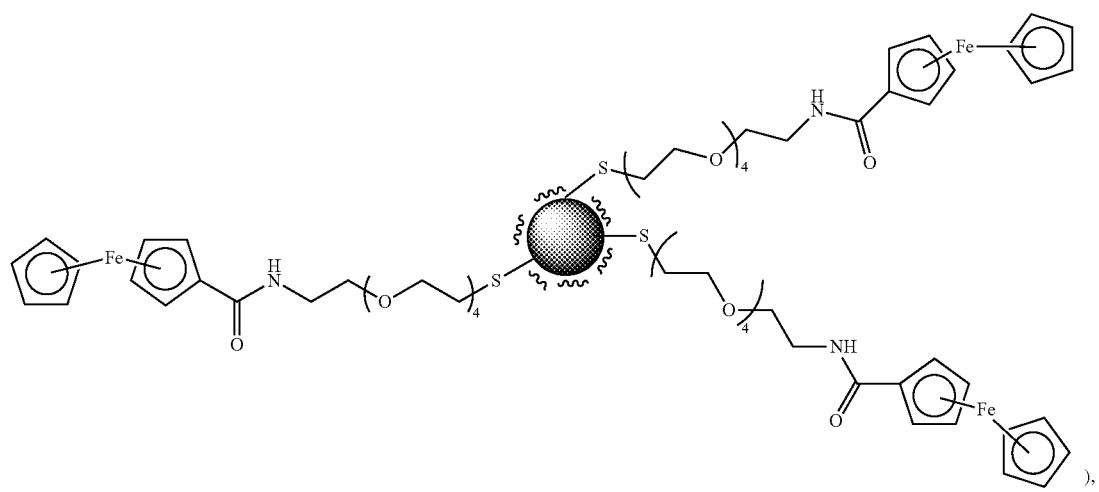

),

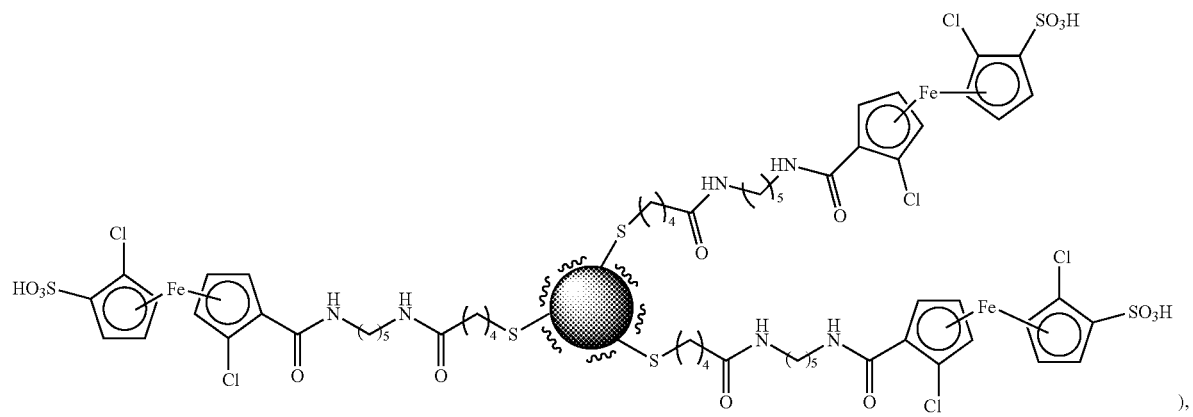

water, diethylene glycol, and glycerol, where ∤ is polyacrylic acid with a molecular weight (Mn) of 1,000 g/mol.

Example 8: Functionalized Conductive Ink

A functionalized conductive ink is prepared from a conductive ink functional material (namely a surface-functionalized palladium nanoparticle

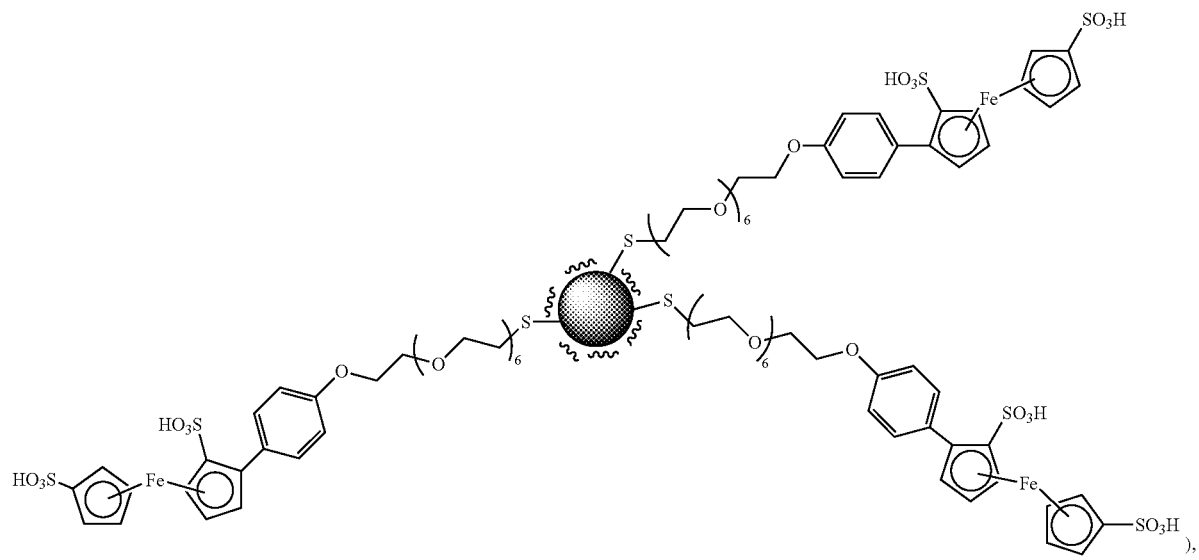

water, diethylene glycol, and glycerol, where ∤ is polyethylene glycol with a molecular weight (Mn) of 60,000 g/mol.

A specific preparation method of the conductive ink functional material includes: adding a palladium nanoparticle to a solvent for full dissolution by ultrasonic treatment; adding a surface-functionalized molecule

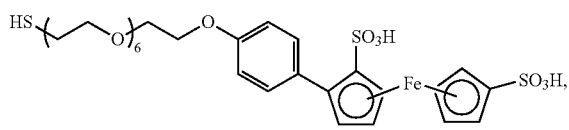

where the mass ratio of the palladium nanoparticle to the

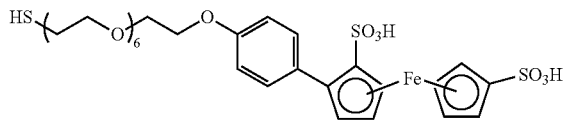

was 1:10; conducting stirring for a reaction at room temperature for 8 hours; after the reaction was completed, conducting centrifugation at 10,000 rpm for 1 minute to separate a solid phase and a liquid phase; and washing the obtained solid phase for 3 times, and then conducting vacuum drying.

Example 9: Functionalized Conductive Ink

A functionalized conductive ink is prepared from a conductive ink functional material (namely a surface-functionalized gold nanoparticle

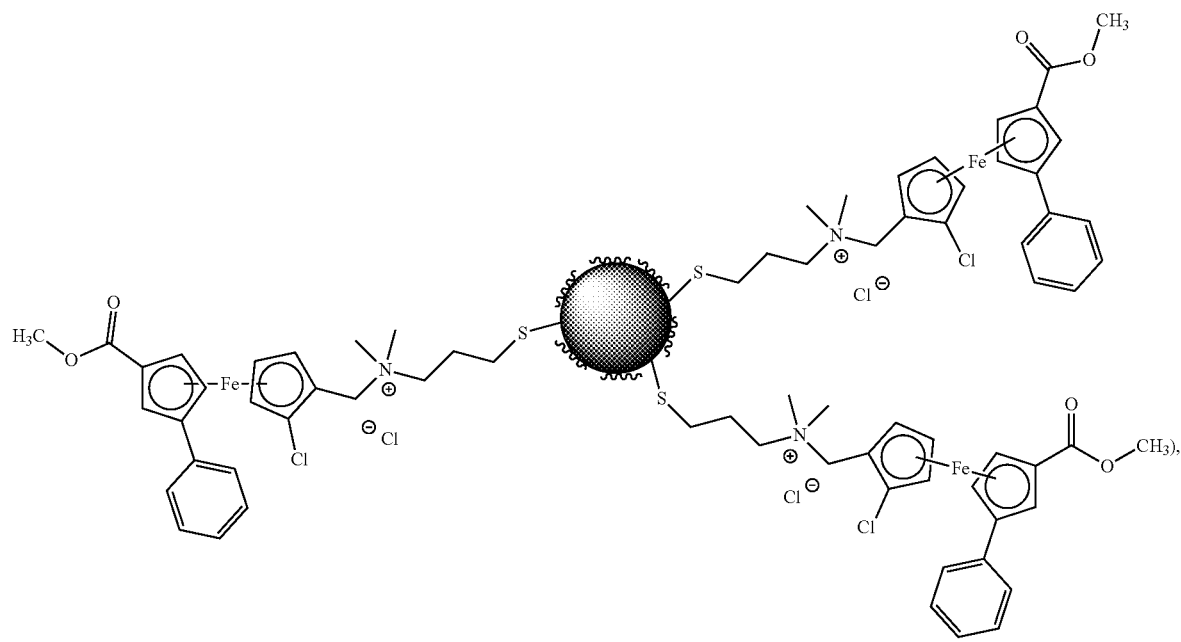

water, diethylene glycol, and glycerol, where ∫ is polymethyl acrylate with a molecular weight (Mn) of 800,000 g/mol.

Example 10: Functionalized Conductive Ink

A functionalized conductive ink is prepared from a conductive ink functional material (namely a surface-functionalized platinum nanoparticle

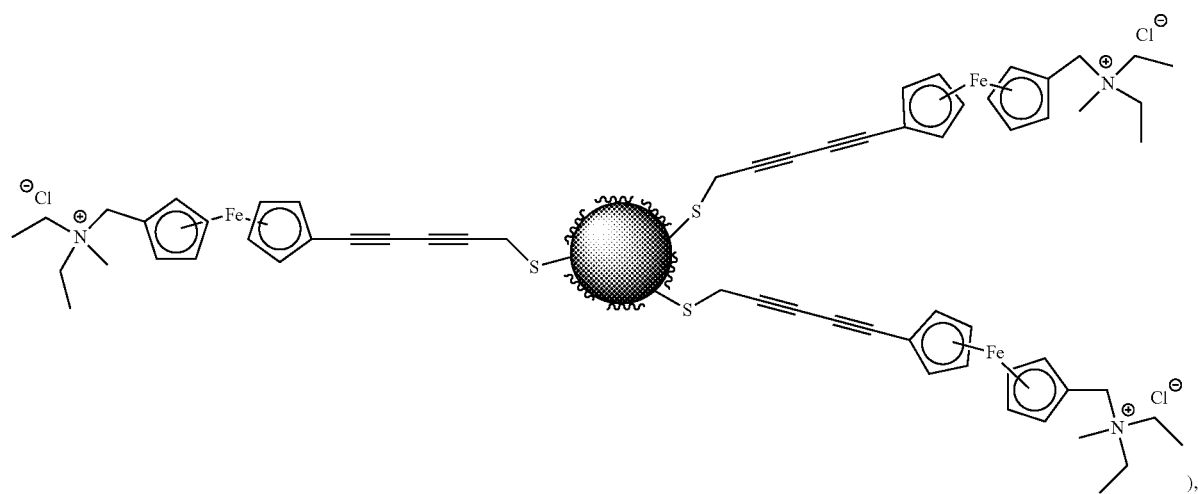

water, diethylene glycol, and glycerol, where ∫ is a polyurethane-acrylate copolymer with ∫ a molecular weight (Mn) of 150,000 g/mol.

Example 11: Preparation of the Functionalized Conductive Ink in Example 6

The silver conductive ink functional material

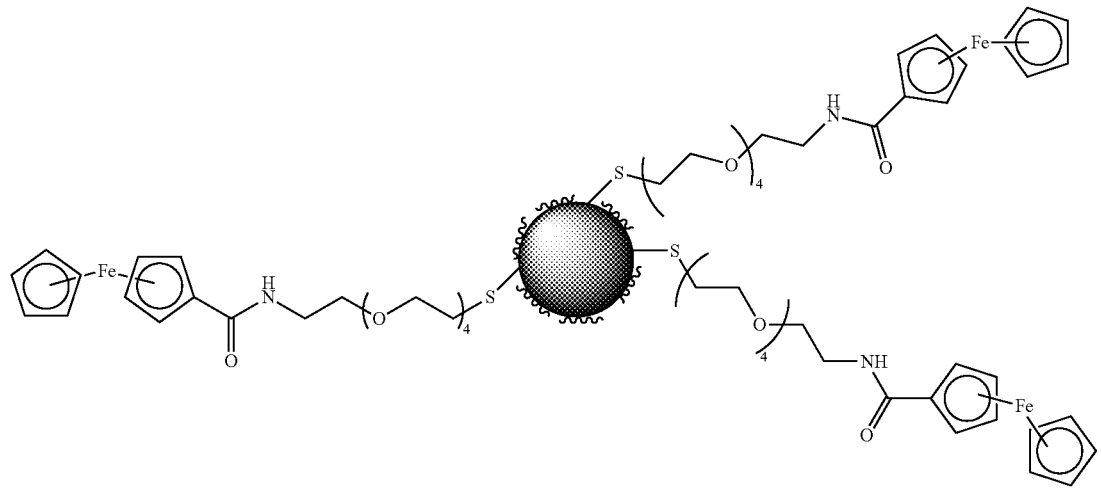

and the water were mixed at a ratio of 0.1 g:1 mL and subjected to ultrasonic treatment under the condition of an ice water bath. The diethylene glycol and the glycerol were added for adjusting the viscosity to 12 CPS, so as to obtain a functionalized conductive ink. Then the functionalized conductive ink was filtered and stored for later use.

Example 12: Preparation of the Functionalized Conductive Ink in Example 7

The gold conductive ink functional material

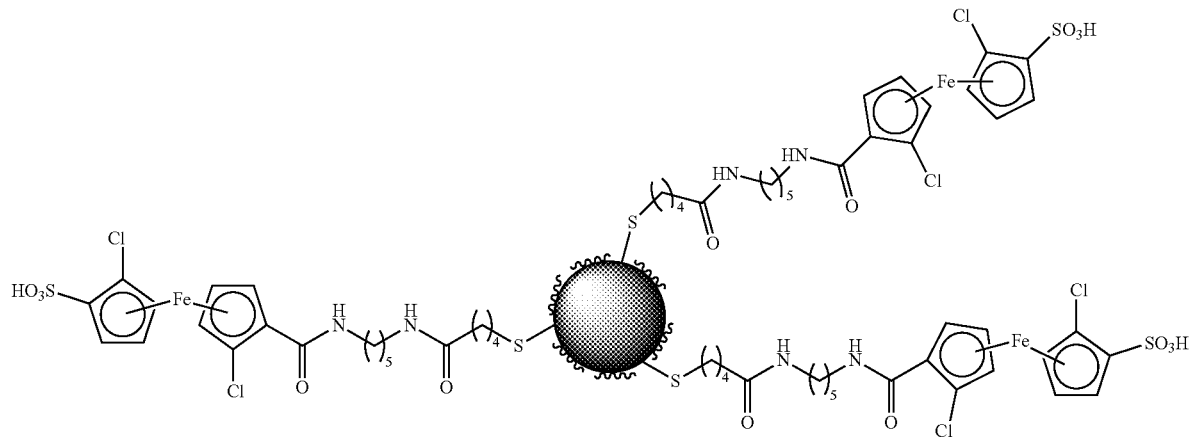

and the water were mixed at a ratio of 0.25 g:1 mL and subjected to ultrasonic treatment. The diethylene glycol and the glycerol were added for adjusting the viscosity to 20 CPS, so as to obtain a functionalized conductive ink. Then the functionalized conductive ink was filtered and stored for later use.

Example 13: Preparation of the Functionalized Conductive Ink in Example 8

The palladium conductive ink functional material

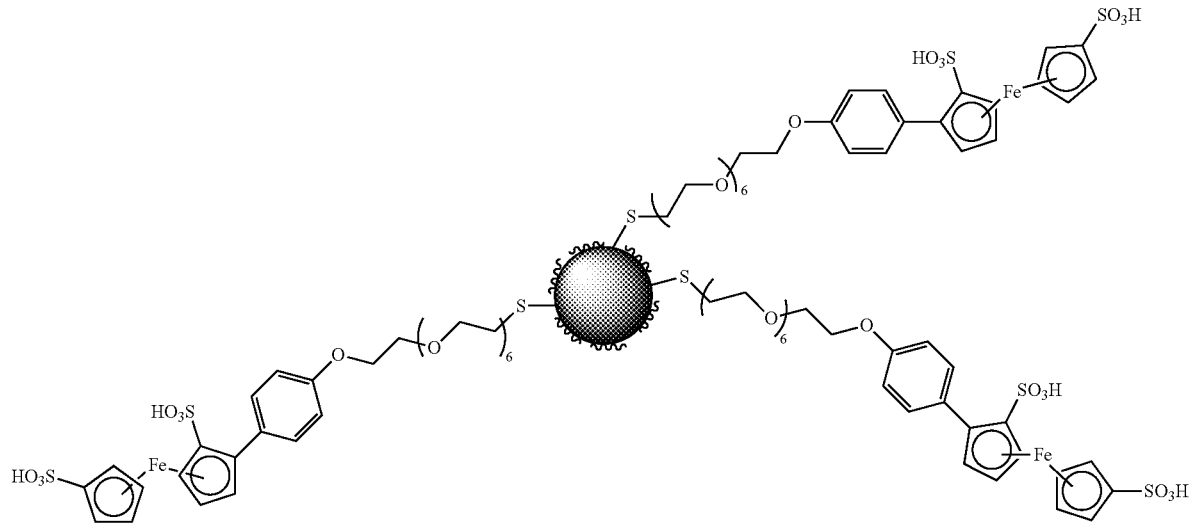

and the water were mixed at a ratio of 0.40 g:1 mL and subjected to ultrasonic treatment. The diethylene glycol and the glycerol were added for adjusting the viscosity to 200 CPS, so as to obtain a functionalized conductive ink. Then the functionalized conductive ink was filtered and stored for later use.

Figure 3:
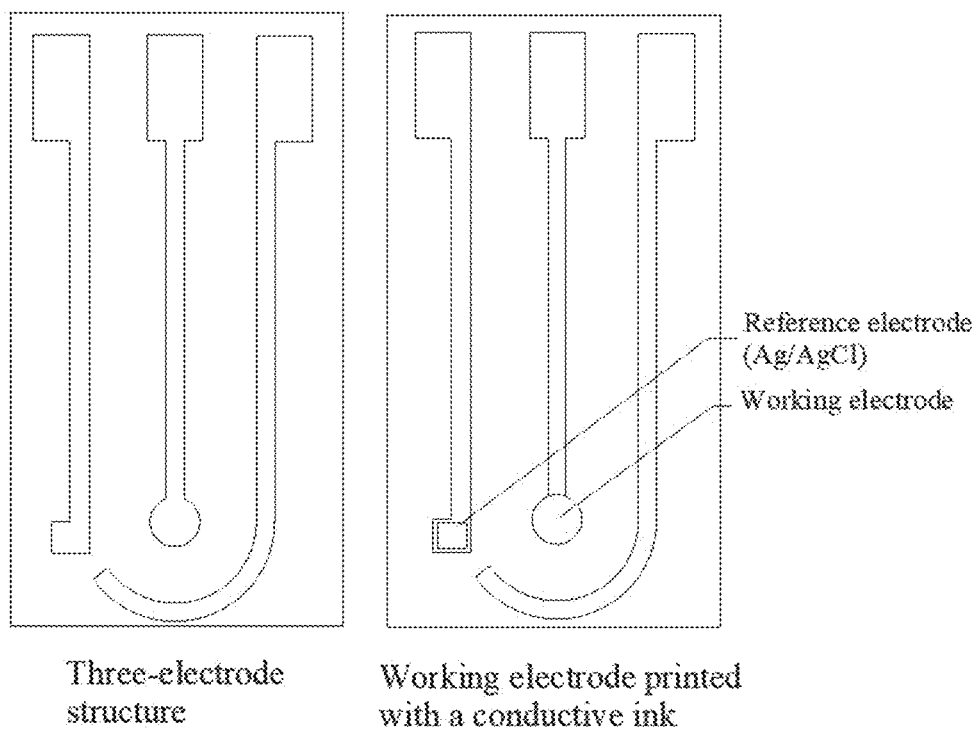
FIG. 3 is a schematic diagram showing a preparation method of an electrode of a biosensor.

Example 14: Application of the Functionalized Conductive Ink in Example 6 to a Biosensor, as Shown in FIG. 3

Three electrodes of a biosensor were prepared by printing with a general conductive ink first. An Ag/AgCl reference electrode material was placed on the left electrode. Next, the middle electrode was completely covered with the functionalized conductive ink in Example 1 by an inkjet printing method, subjected to drying, and placed in a drying oven for heat curing at a temperature of 100° C. for 1 hour. After that, a glucose oxidase solution with a concentration of 5% by mass percentage was dropped on the surface of the electrode, and subjected to drying. Then, the sensor was placed in a vapor environment of glutaraldehyde for crosslinking of glucose oxidase, so as to prepare a working electrode. The rest one blank electrode was used to form a counter electrode.

Example 15: Application of the Functionalized Conductive Ink in Example 7 to a Biosensor A PET substrate was covered with a circuit structure of a biosensor by printing with a general conductive ink first to prepare a biosensor circuit. Next, the functionalized conductive ink was injected into an ink box of a DMP-2831 printer, and an electrode was prepared on the biosensor circuit, subjected to drying, and placed in a drying oven for heat curing at a temperature of 80° C. for 2 hours. Then, a glucose oxidase solution with a concentration of 5% by mass percentage was dropped on the surface of the electrode, and subjected to drying, so as to form a working electrode.

Example 16: Application of the Functionalized Conductive Ink in Example 8 to a Biosensor Electrodes of a biosensor were prepared by printing with a general conductive ink first. Next, one electrode was completely covered with the functionalized conductive ink by a micro-dropping method, subjected to drying, and placed in a drying oven for heat curing at a temperature of 70° C. for 4 hours. Then, a glucose oxidase-containing solution was dropped on the surface of the electrode, and subjected to drying, so as to form a working electrode.

Example 17: Application of the Functionalized Conductive Ink in Example 9 to a Biosensor, as Shown in FIG. 3

Three electrodes of a biosensor were prepared by printing with a general conductive ink first. An Ag/AgCl reference electrode material was placed on the left electrode. Next, the middle electrode was completely covered with the functionalized conductive ink by a micro-dropping method, and subjected to drying, followed by NIR photocuring (at 800 nm to 1,200 nm and 1 mW/m² for 30 seconds). Then, a glucose oxidase-containing solution was dropped on the surface of the electrode, and subjected to drying, so as to form a working electrode.

Example 18: Application of the Functionalized Conductive Ink in Example 10 to a Biosensor Electrodes of a biosensor were prepared by printing with a general conductive ink first. Next, one electrode was completely covered with the functionalized conductive ink by inkjet printing, and subjected to drying, followed by NIR photocuring (at 800 nm to 1,200 nm and 0.1 mW/m² for 60 seconds). Then, a glucose oxidase solution with a concentration of 5% by mass percentage was dropped on the surface of the electrode, and subjected to drying, so as to form a working electrode.

In order to verify the effect of the present disclosure, comparative tests of properties of products are also carried out by the inventor. A conductive ink for comparison is prepared, and made into biosensors with the functionalized conductive ink in Example 1 respectively. Then properties of the biosensors are compared.

Experimental Example

Comparative Experiments of Properties of Biosensors
1. Experimental Materials:
The functionalized conductive ink in Example 1 and a biosensor made by printing were used.
Comparative example: A conductive ink was prepared from a silver conductive ink material without surface functionalization, and then a glucose biosensor was made by printing.
The two biosensors in comparative experiments are nearly the same in the thickness of conductive layers and the roughness of surfaces, are consistent in the use amount of enzymes on working electrodes and the morphology and size of enzyme layers, and are the same in the thickness of HPU films.
2. Comparative Experiment of the Working Voltage of Biosensors
The two biosensors were placed in a 100 mg/dL glucose solution, and cyclic voltammetry curves were measured. Results are as shown in FIG. 1.
From the figure, it can be seen that the glucose biosensor prepared from the silver conductive ink without functionalization (contrast system) reaches a maximum current value at a working voltage of 680 mV, while the sensor prepared from the functionalized silver conductive ink can reach a maximum current value at 320 mV, which is far less than the working voltage of the contrast system. The lower working voltage indicates that fewer interfering substances are involved in a reaction. Therefore, the glucose sensor prepared from the functionalized silver conductive ink has a better anti-interference ability.
From FIG. 1, it can also be seen that in the same concentration of the glucose solution, the glucose sensor prepared from the functionalized silver conductive ink has a detectable maximum current of 550 nA, which is more than four times that of the contrast system (120 nA), indicating that the charge transfer efficiency of an enzyme electrode can be significantly improved while the working voltage is reduced, and that is to say, the sensitivity of the sensor is improved.
In addition, the biosensors monitor biological substances by measuring the current generated. According to the data in FIG. 1, the following results can be obtained: when the electrodes are nearly the same in area and surface roughness (namely, nearly same total surface area), the electric quantity expressed as 550 nA÷120 nA≈4.6 times can be generated when the functionalized conductive ink is used. That is to say, when the electrode is prepared from the functionalized conductive ink, the current intensity of the electrode prepared from the conductive ink material without functionalization can be obtained by using only 1/4.6 of the electrode area.
3. Comparative Experiment of the Working Current of Biosensors
The two biosensors were placed in a 50 mg/dL glucose solution, a 100 mg/dL glucose solution, and a 200 mg/dL glucose solution in sequence, and then current signals of the two biosensors were measured. In the experiment, the biosensor prepared from the functionalized silver conductive ink was set to have a working voltage of 320 mV, and the contrast system was set to have a working voltage of 680 mV. Results are as shown in FIG. 2.
From the figure, it can be seen that the two biosensors can respond to changes in the concentration of glucose in the solutions, but in each concentration, the current value measured by the biosensor prepared from the functionalized silver conductive ink is much greater than that of the contrast system, indicating that the sensitivity of the sensor can be improved by using the functionalized silver conductive ink.
4. Conclusion
The above experiments show that the biological electrode prepared from the functionalized conductive ink of the present disclosure has higher electron transmission efficiency, the electrode area can be decreased without reducing the signal intensity, and the purpose of reducing the size of the biosensor is achieved. Meanwhile, the obtained biosensor can detect biological substances at lower working voltage.

Although the present disclosure has been described in detail with respect to the previously described embodiments, it should be appreciated by one skilled in art that the technical solutions recorded in the embodiments may be still modified, or a part of technical features may be replaced with equivalents; and such modifications or substitutions do not deviate the nature of the technical solutions from the spirit and scope of the technical solutions of the various embodiments in the present disclosure.

What is claimed is:
1. A conductive ink functional material, wherein the conductive ink functional material is a surface-functionalized metal nanoparticle having a structure as shown in a formula I:

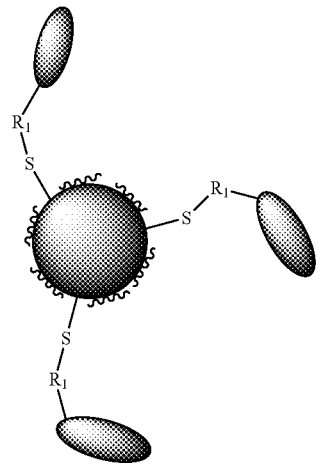

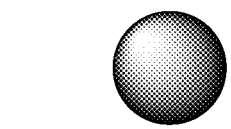

is a metal nanoparticle;

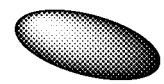

is a medium structure; $\jmath$ is a protective agent; and $R_1$ is an organic structure consisting of C, N, O and H.

2. The conductive ink functional material according to claim 1, wherein the medium structure is an organic complex of iron; and the $R_1$ is selected from a linear/branched/cyclic hydrocarbyl, an organic structure containing lipid/ether/amide/quaternary ammonium group/polyethylene glycol, or any combination of the hydrocarbyl and the organic structure.

3. The conductive ink functional material according to claim 2, wherein the medium structure is ferrocene or a derivative thereof having the following structural formula:

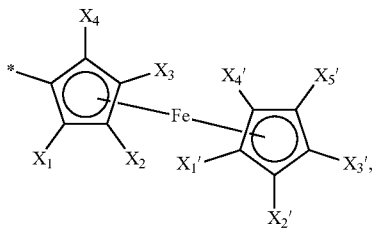

$X_1$, $X_2$, $X_3$, $X_4$, $X_1'$, $X_2'$, $X_3'$, $X_4'$, and $X_5'$ are independently selected from one of the following groups:

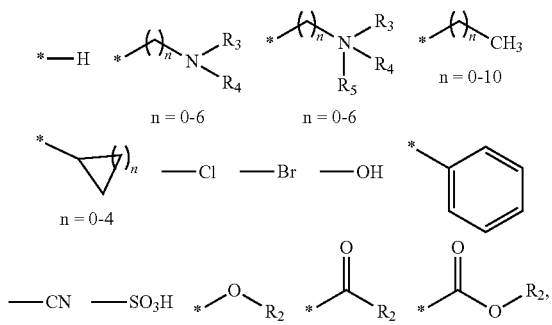

and $R_2$, $R_3$, $R_4$, and $R_5$ are a structure consisting of H, a linear/branched/cyclic hydrocarbyl, and a group containing lipid/ether.

4. The conductive ink functional material according to claim 2, wherein the $R_1$ is selected from the following structures or any combination thereof:

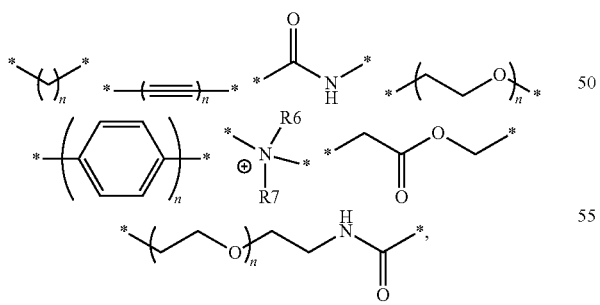

n is an integer ranging from 1 to 10, and $R_6$ and $R_7$ are H or a linear/branched/cyclic hydrocarbyl.

5. The conductive ink functional material according to claim 1, wherein the metal is one of Ag, Au, Cu, Zn, Ni, Co, Pd, Pt, Zr, Cr, Ru, Os, Ir, Sn, Pb, Al, Mo, and W; and the protective agent is one of polymers with the following structures and has a molecular weight of 500-1,000,000:

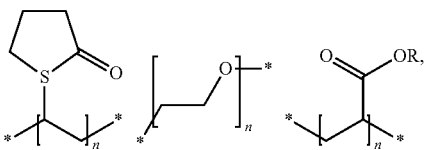

and R is a structure consisting of H, a linear/branched/cyclic hydrocarbyl, and a group containing lipid/ether.

6. The conductive ink functional material according to claim 5, wherein the metal is Ag, Au, Pd, or Pt; and the protective agent is one of polyvinylpyrrolidone, polyacrylic acid, polyacrylate, and polyethylene glycol, and has a molecular weight of 1,000-10,000.

7. A functionalized conductive ink, wherein the functionalized conductive ink is prepared from the conductive ink functional material according to claim 1.

8. A preparation method of the conductive ink functional material according to claim 1, wherein a reaction route comprises:

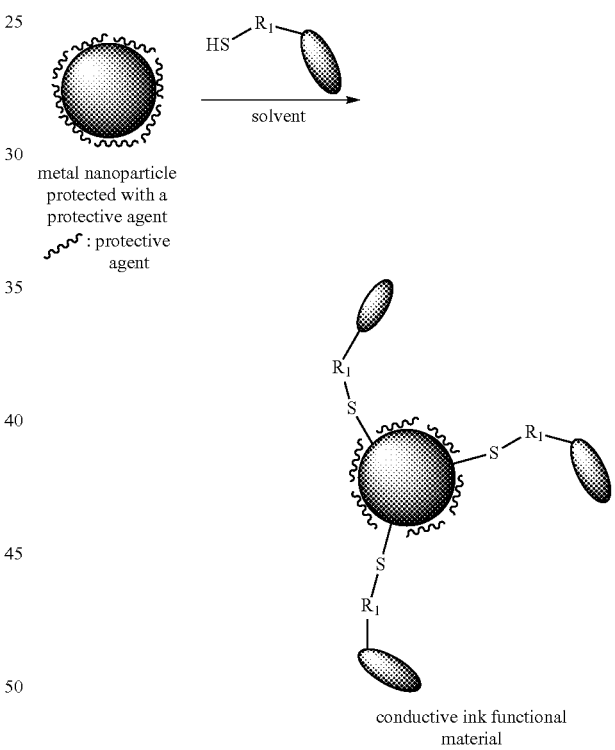

dissolving a metal nanoparticle; adding a surface-functionalized molecule to an obtained solution; conducting stirring for a reaction at room temperature; after the reaction is completed, conducting centrifugation at high speed to separate a solid phase and a liquid phase; and subjecting the obtained solid phase to washing and vacuum drying to obtain the conductive ink functional material.

9. The preparation method of the conductive ink functional material according to claim 8, wherein
the metal nanoparticle is added to a solvent for full dissolution by ultrasonic treatment; the surface-functionalized molecule

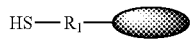

is added, wherein we mass ratio of the metal nanoparticle to the

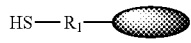

is 1,000:1 to 1.10; stirring is conducted for a reaction at room temperature; after the reaction is completed, centrifugation is conducted at 10,000 rpm to separate a solid phase and a liquid phase; and the obtained solid phase is washed for 3 times, and then vacuum drying is conducted to obtain the conductive ink functional material.

10. The preparation method of the conductive ink functional material according to claim 9, wherein the mass ratio of the metal nanoparticle to the

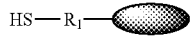

is 10:1 to 1:10; the stirring is conducted for a reaction at room temperature for 8 hours; and after the reaction is completed, the centrifugation is conducted at 10,000 rpm for 1-5 minutes to separate a solid phase and a liquid phase.

11. The preparation method of the conductive ink functional material according to claim 9, wherein a preparation method of the metal nanoparticle comprises: dissolving a metal salt and a protective agent at a mass ratio of 10:1 to 1:1,000 in a solvent separately; heating a protective agent solution to 120° C., and adding a metal salt solution dropwise under stirring; after the dropping is completed, conducting stirring continuously for a reaction at 120° C. for 6 hours, and conducting cooling to room temperature; after the reaction is completed, conducting washing on an obtained solution for 3 times; and drying a precipitate at 40° C. for 12 hours to obtain the metal nanoparticle.

12. A preparation method of the functionalized conductive ink according to claim 7, wherein
a conductive ink functional material and water are mixed and subjected to ultrasonic treatment; diethylene glycol and glycerol are added for adjusting the viscosity to 5-200 CPS, so as to obtain a functionalized conductive ink containing the conductive ink functional material with a mass concentration of 5%-40%; and then the functionalized conductive ink is filtered and stored.

13. Application of the functionalized conductive ink according to claim 7 to a biosensor.

14. The application of the functionalized conductive ink according to claim 13, wherein electrodes of a biosensor are prepared by printing with a general conductive ink first; next, one electrode is completely covered with the functionalized conductive ink by an inkjet printing or micro-dropping method, and subjected to drying, followed by heat curing or NIR photocuring; and then, a glucose oxidase-containing solution is dropped on the surface of the electrode, and subjected to drying, so as to form a working electrode.

15. The application of the functionalized conductive ink according to claim 14, wherein the heat curing is conducted at a temperature of 70-100° C.; and the NIR photocuring is conducted at 800-1,200 nm and 0.1-2 mW/m$^2$.

* * * * *